US011190528B2

(12) United States Patent
Tzeng et al.

(10) Patent No.: US 11,190,528 B2
(45) Date of Patent: Nov. 30, 2021

(54) LIGHT-WEIGHT MECHANISM FOR CHECKING MESSAGE INTEGRITY IN DATA PACKETS

(71) Applicant: Avago Technologies International Sales Pte. Limited, Singapore (SG)

(72) Inventors: Jeffrey Tzeng, Cupertino, CA (US); Abhijit K. Choudhury, Cupertino, CA (US); Alan Y. Kwentus, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 319 days.

(21) Appl. No.: 16/172,206

(22) Filed: Oct. 26, 2018

(65) Prior Publication Data
US 2019/0166134 A1 May 30, 2019

Related U.S. Application Data

(60) Provisional application No. 62/591,618, filed on Nov. 28, 2017.

(51) Int. Cl.
*H04L 29/06* (2006.01)
*H04L 29/08* (2006.01)
*H04L 9/32* (2006.01)

(52) U.S. Cl.
CPC .......... *H04L 63/123* (2013.01); *H04L 9/3242* (2013.01); *H04L 63/0428* (2013.01);
(Continued)

(58) Field of Classification Search
CPC . H04L 63/123; H04L 69/324; H04L 63/0428; H04L 63/20; H04L 9/3242;
(Continued)

(56) References Cited

U.S. PATENT DOCUMENTS 7,343,540 B2 * 3/2008 Khermosh ............ H04L 1/0057
714/758
9,929,928 B1 * 3/2018 Dekoos ................. H04L 41/147
(Continued)

OTHER PUBLICATIONS

European Search Report dated Apr. 24, 2019, issued in corresponding European Patent Application No. 18207833.7, 8 pages.

*Primary Examiner* — Mahfuzur Rahman
(74) *Attorney, Agent, or Firm* — Morgan, Lewis & Bockius LLP (57) ABSTRACT

This disclosure presents a technique to include a packet sequence number and an integrity check value (ICV) into a data frame while maintaining a total number of transmitted bytes. A transmitting device includes circuitry that generates the ICV, inserts a transmitter packet sequence number into the data frame that includes a data packet including a payload, the data packet following a preamble and an interpacket gap (IPG) following the data packet. The circuitry also inserts the ICV into the data frame, and transmits the data frame, wherein inserting the ICV into the data frame reduces a size of the IPG while maintaining a total number of bytes in the data frame. A receiving device includes circuitry that receives the data frame, compares a receiver packet sequence number to the transmitter packet sequence number, and determines whether the transmitter packet sequence number is valid based on the receiver packet sequence number.

20 Claims, 5 Drawing Sheets

(52) U.S. Cl.
CPC .......... *H04L 63/1425* (2013.01); *H04L 63/20* (2013.01); *H04L 69/324* (2013.01)

(58) Field of Classification Search
CPC ............. H04L 63/1425; H04L 63/1416; H04L 63/1441; H04L 63/16; H04L 9/0643; H04L 9/3236; H04L 2209/12
See application file for complete search history.

(56) References Cited

U.S. PATENT DOCUMENTS

| | | | | |
|---|---|---|---|---|
| 10,826,876 | B1* | 11/2020 | Sinn | H04L 63/123 |
| 2003/0128664 | A1* | 7/2003 | Connor | H04L 47/10 |
| | | | | 370/229 |
| 2005/0157715 | A1 | 7/2005 | Hiddink et al. | |
| 2011/0072307 | A1* | 3/2011 | Hatley | H04L 43/50 |
| | | | | 714/32 |
| 2012/0082156 | A1* | 4/2012 | Swartzentruber | H04L 7/0091 |
| | | | | 370/389 |
| 2014/0337538 | A1* | 11/2014 | Lamothe | H04L 7/02 |
| | | | | 709/248 |
| 2015/0003235 | A1 | 1/2015 | Cho et al. | |
| 2015/0092545 | A1* | 4/2015 | Katar | H04L 1/0078 |
| | | | | 370/230 |

\* cited by examiner

LIGHT-WEIGHT MECHANISM FOR CHECKING MESSAGE INTEGRITY IN DATA PACKETS

CROSS REFERENCE TO RELATED APPLICATION(S)

The present application is based on and claims the benefit from U.S. Provisional Application No. 62/591,618, filed Nov. 28, 2017, the entire content or which is hereby incorporated by reference.

BACKGROUND

Field

The present disclosure is directed to a lightweight mechanism for checking message integrity in data packets.

Description of the Related Art

In network communications, such as Ethernet, there are several ways to implement transmission security. At the datalink layer, there are two typical methods to secure networks. One such method is protocol IEEE 802.1X, which utilizes an authentication protocol to ensure that only trusted entities can connect to the network. Another method is a link-by-link protocol IEEE 802.1AE, also known as Media Access Control (MAC) Security (MACsec), which utilizes a cryptographic protocol on a data packet to authenticate and/or encrypt the data packet. This ensures that the data packet has not been tampered with.

In fields such as in the automotive space, a major security concern is the threat of Man-in-the-Middle (MITM) attacks on Ethernet links by a hacker. MITM attacks may occur between a client, such as a camera, and a switch, such as a vehicle server. Once a valid client (camera) performs 802.1X and connects to a switch, the hacker, who is located in the middle and is able to observe all the communications, is able to transmit and receive packets on the link as well. The hacker can insert new packets, modify packets, or re-send packets previously transmitted and captured on the link.

In such situations, the only way to guarantee the integrity of the data packet is to perform checks on every packet. However, traditional approaches like MACsec add considerable overhead (e.g. payload) and consume link bandwidth. Thus, an improved apparatus and method for lightweight message integrity checking between two, endpoints is desired.

SUMMARY

The present disclosure relates to a transmitting device that includes processing circuitry configured to maintain a transmitter packet sequence counter; generate an integrity check value (ICV); insert a transmitter packet sequence number according to the transmitter packet sequence counter into a data frame that includes a data packet, the data packet including a payload, wherein the data packet follows a preamble and an interpacket gap (IPG) follows the data packet: insert the Icv into the data frame; and transmit the data frame, wherein the processing circuitry maintains the transmitter packet sequence counter by incrementing a transmitter packet sequence counter value by one with each data frame transmitted, and inserting the ICV into the data frame reduces the size of the IPG while maintaining a total number of bytes in the data frame.

The present disclosure further relates to a receiving device that includes processing circuitry configured to receive a data frame including a transmitter packet sequence number, an integrity check value (ICV), and a data packet, the data packet including a payload, wherein the data packet follows a preamble and an interpacket gap (IPG) follows the data packet; compare a receiver packet sequence number from the receiver packet sequence counter to the transmitter packet sequence number; determine whether the transmitter packet sequence number is valid based on the receiver packet sequence number; in response to determining, that the transmitter packet sequence number is valid, determine whether the ICV is valid; and in response to determining that the ICV is valid, remove the transmitter packet sequence number and the ICV from the data frame; and maintain the receiver packet sequence count by incrementing a sequence count value by one with each data frame received, wherein removal of the transmitter packet sequence number and the ICV restores the format of the data frame to a format readable by a data-link layer, and the processing circuitry maintains the receiver packet sequence counter by incrementing a receiver packet sequence counter value by one with each data frame received.

The present disclosure further relates to a method performed by a transmitting device that communicates with a receiving device via a network, the method including maintaining a transmitter packet sequence counter; generating an integrity check value (ICV); inserting, by processing circuitry of the transmitting device, a transmitter packet sequence number into a data frame that includes a data packet, the data packet including a payload, wherein the data packet follows a preamble and an interpacket gap (IPG) follows the data packet; inserting, by the processing circuitry, the ICV into the data frame; and transmitting the data frame, wherein the maintaining the transmitter packet sequence counter includes incrementing a transmitter packet sequence counter value by one with each data frame transmitted, and inserting the ICV into the data frame reduces a size of the IPG while maintaining a total number of bytes in the data frame.

The present disclosure further relates to a transmitting device that includes processing circuitry configured to generate an integrity check value (ICV); and insert the ICV into a data frame that includes a data packet, the data packet including a payload, wherein the data packet follows a preamble, and an interpacket gap (IPG) follows the data packet, and inserting the ICV into the data frame reduces the size of the IPG while maintaining a total number of bytes in the data frame.

The present disclosure further relates to a transmitting device that includes processing circuitry configured to maintain a transmitter packet sequence counter; insert a transmitter packet sequence number according to the transmitter packet sequence counter into a data frame that includes a data packet, the data packet including a payload, wherein the data packet follows a preamble and an interpacket gap (IPG) follows the data packet; and transmit the data frame, wherein the processing circuitry maintains the transmit packet sequence counter by incrementing a transmitter packet sequence counter value by one with each data frame transmitted, and inserting the transmitter packet sequence number into the data frame reduces the size of the IPG while maintaining a total number of bytes in the data frame.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE DRAWINGS

The description set forth below in connection with the appended drawings is intended as a description of various implementations of the disclosed subject matter and is not necessarily intended to represent the only implementation(s). In certain instances, the description includes specific details for the purpose of providing an understanding of the disclosed subject matter. However, it will be apparent to those skilled in the art that implementations may be practiced without these specific details. In some instances, well-known structures and components may be shown in block diagram form in order to avoid obscuring the concepts of the disclosed subject matter.

Reference throughout the specification to "one implementation" or "an implementation" means that a particular feature, structure, characteristic, operation, or function described in connection with an implementation is included in at least one implementation of the disclosed subject matter. Thus, any appearance of the phrases "in one implementation" or "in an implementation" in the specification is not necessarily referring to the same implementation. Further, the particular features, structures, characteristics, operations, or functions may be combined in any suitable manner in one or more implementations. Further, it is intended that implementations of the disclosed subject matter can and do cover modifications and variations of the described implementations.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit implementations of the disclosed subject matter to any particular orientation or configuration. Furthermore, terms such as "first," "second," "third," etc., merely identify one of a number of portions, components, points of reference, operations and/or functions as described herein, and likewise do not necessarily limit implementations of the disclosed subject matter to any particular configuration or orientation.

In a network, such as Ethernet, security protocols may be used to authenticate two endpoints during an initialization of the endpoints on the network. For example, in an automobile utilizing IEEE 802.1X, starting the ignition may initiate authentication between a client device, such as a camera, and a switch or a Micro-Controller Unit (MCU) in the vehicle. For example, the camera and the switch may store predetermined credentials in order to perform an Extensible Authentication Protocol MAP) exchange via a four-way handshake protocol. The four-way handshake protocol may authenticate the camera and switch and allow the camera access to the switch to send traffic in, and vice-versa.

However, once the two endpoints are authenticated, continued authentication is not performed on data packets to check the integrity of the data packets since the underlying assumption for IEEE 802.1X is that the network is secure. This may be true for some networks like enterprise networks, but is not necessarily for other networks, like automotive networks. For example, the hacker may install a hub between the camera and the switch or MCU while the vehicle is off and/or in a parked position. The camera and switch perform the EAP exchange and open the switch portal to send and receive data, but the hacker is also able to monitor the traffic, replay packets sent by the camera at a later time, and insert malicious packets. Thus, continual authentication of packets is needed to screen and reject tampered packets.

This scenario may be prevented by the use of a cryptographic protocol such as MACsec. Such protocols insert an Integrity Check Value (ICV) into every data packet sent by the camera based on a predetermined cryptographic protocol and shared keys. Based on the ICV and the shared keys, the switch may verify whether the data packet comes from the camera. MACsec may also utilize a replay counter that allows the switch to determine whether packets are received out of order since every data packet may include a sequence number.

However, use of the MACsec protocol may add an additional overhead to the data packet. For example, on an Ethernet network, a data packet that is 64 bytes in size may have an additional 32 bytes of security data added to the data packet. For a low bandwidth link, such as a 100 megabits per second link, this additional security may consume an additional 28% of the bandwidth. Thus, an improved method and apparatus of maintaining packet security across a network while also maintaining low overhead is desired.

Referring now to the drawings, wherein like reference numerals designate identical or corresponding parts throughout the several views.

Figure 1A:
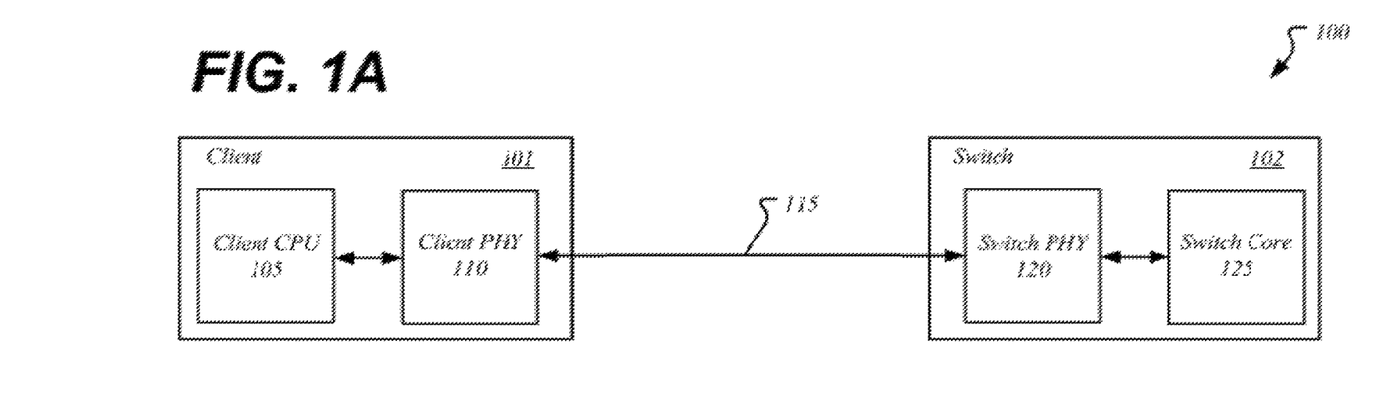
FIG. 1A illustrates a block diagram of an exemplary network.

FIG. 1A illustrates a block diagram of an exemplary network 100. The network 100 may include a client 101 and a switch 102. The client 101 may include a client central processing unit (CPU) 105 and a client physical layer (PHY) 110, and the switch 102 may include a switch PHY 120 and a switch core 125, wherein the client PHY 110 and switch PHY 120 may be communicatively connected by a link 115. The client PHY 110 and switch PHY 120, which implement the layer-1 in an Open Systems Interconnection (OSI) stack, may be integrated or may be an external physical layer device or chip. The client PHY 110 and switch PITY 120 may be configured to interface physical media with other layers in the OSI, such as the MAC layer in a data link layer (layer-2). The client PHY 110 and switch PITY 120 may be configured to convert MAC layer communication to a format suitable for transmission over the link 115. Link 115 may be a wired (for example, an Ethernet cable) or wireless communication link between client PITY 110 and switch PITY 120.

Figure 1B:
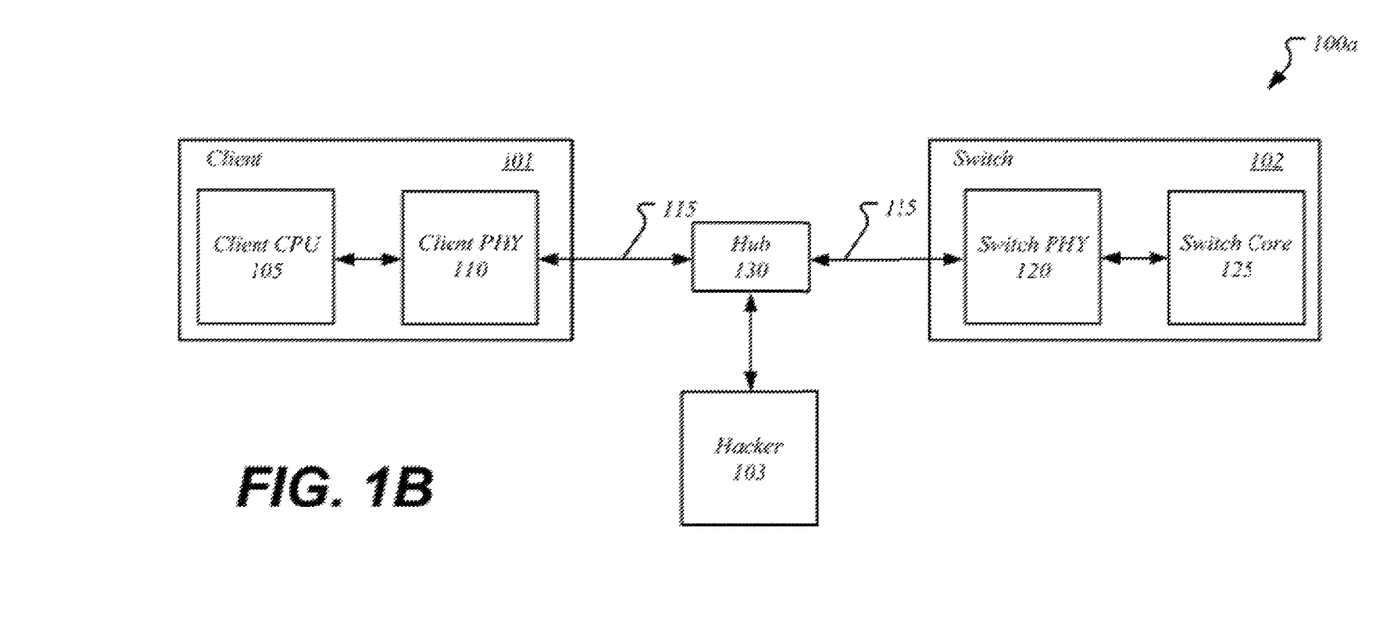
FIG. 1B illustrates a block diagram of an exemplary network compromised by a hacker.

As illustrated in FIG. 1B, a hacker 103 may tap into a compromised network 100a via the link 115 between two end points in a MITM attack. The hacker 103 may insert a hub 130, for example an Ethernet hub, on the link 115 between the client 101 and the switch 102 before initialization via the EAP exchange. The hub 130 may include multiple ports and be, for example, a network hub, and configured to connect segments of the network 100.

The hacker 103 may send and receive packets on the link 115 via the hub 130 as well. The hacker 103 may insert new packets, modify packets, or re-send packets that have previously been transmitted and captured on the link 115, For example, the hacker 103 may capture camera feed and replay the feed to the switch at a later time. For example, the hacker 103 may intercept a message transmitted from the brakes in the vehicle to signal engagement of the brakes, wherein the message is altered to disengage the brakes or keep the brakes disengaged. These are non-limiting examples and the present disclosure is not limited to the automotive space.

Figure 2:
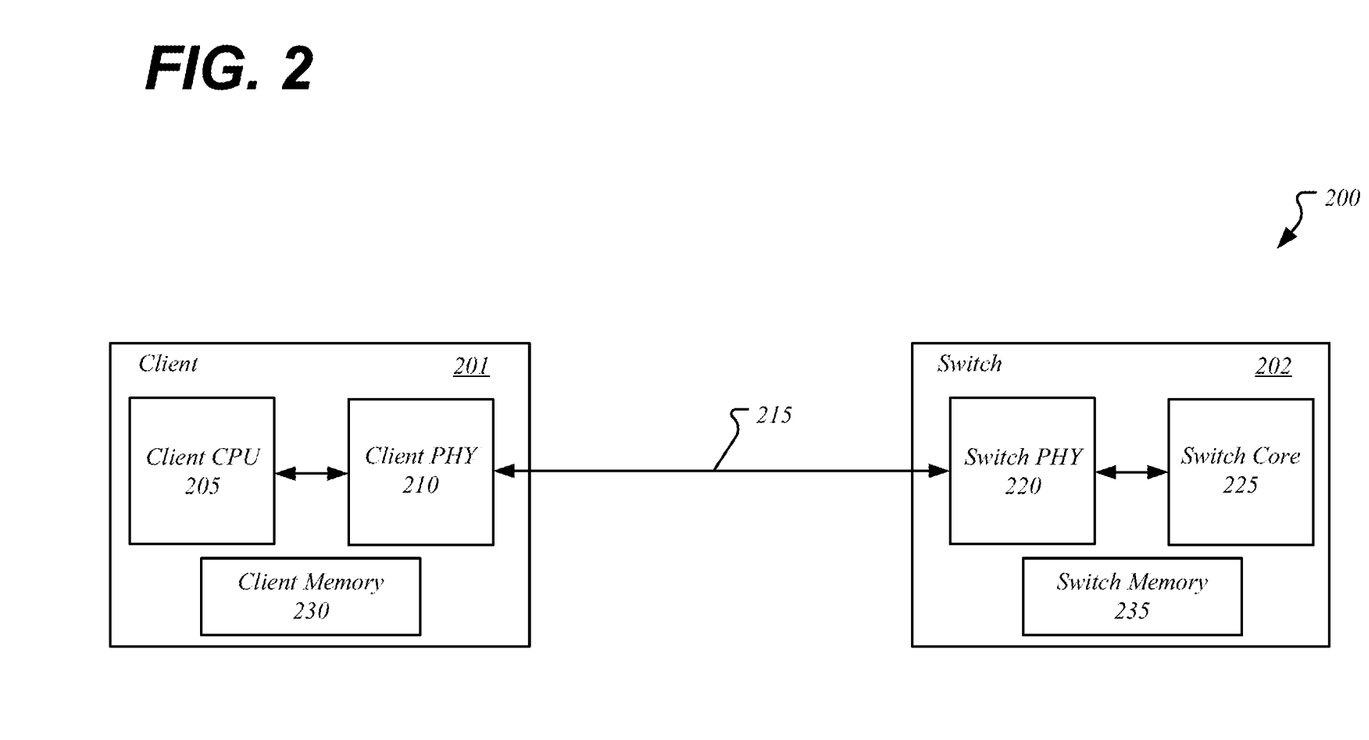
FIG. 2 illustrates a secured network according to an exemplary implementation of the present disclosure.

FIG. 2 illustrates a block, diagram of a secured network 200, according to an exemplary implementation of the present disclosure. The secured network 200 may include a client 201 and a switch 202. The client 201 may be a transmitting device or other type of device, for example a transmitter, and the switch 202 may be a receiving device or other type of device, for example a receiver.

The client 101 may include a client CPU 205, a client PHY 210, and a client memory 230, and the switch 102 may include a switch PHY 220, a switch core 225 and a switch memory 235, wherein the client PHY 210 and switch PHY 220 may be communicatively connected by a link 215. Client CPU 205 and switch core 225 may include modules, parts, circuits and/or integrated circuits, each of which may be referred to as processing circuitry. The processing circuitry may include a general-purpose processor, and the processing circuitry may include any number of processors, controllers, micro-controllers or state machines. The processing circuitry can also be, a combination of computer equipment, such as a combination of a digital signal processor (DSP) and a micro-processor, a combination of plural micro-processors, or a combination of a DSP and plural micro-processors. The processing circuitry of client 201 and switch 202 may separately or jointly implement each of functionality of the components illustrated in FIG. 2.

In some implementations, the processing circuitry may perform some or all of the functionality. The processing circuitry may encompass the processing circuitry and the client PHY 210 and switch PHY 220, and/or each step may be performed by dedicated processing circuitry. The processing circuitry may be a plurality of individual circuitry or a processing circuitry that is configured to perform some or all of the steps.

The client PHY 210 and switch PHY 220 may be a physical layer device or chip, for example a layer-1 in an Open Systems Interconnection (OSI) stack. The client PHY 210 and switch PHY 220 may be configured to interface physical media with other layers in the OSI, such as the MAC layer in a data link layer. The client PHY 210 and switch PHY 220 may be configured to convert MAC layer communication to a format suitable for transmission over the link 215. The client memory 230 and switch memory 235 may be volatile or non-volatile memory and configured to store authentication information, for example the predetermined authentication keys or security credentials for the EAP exchange. The link 215 may be a wired (for example, an Ethernet cable) or wireless communication link.

As mentioned previously, the EAP exchange may occur between the client 201 and the switch 202. For example, the client 201 may be a camera and the switch 202 may be a server. Alternatively, the client 201 may be a vehicle's brakes and the switch 202 may be a computer in the vehicle. To prevent the hacker 103 from tampering with data sent over the link 115, each data packet may be encoded by the client PHY 210 with its own authentication information before transmission and the encoded data packet may be read and authenticated by the switch PHY 220.

Figure 3A:
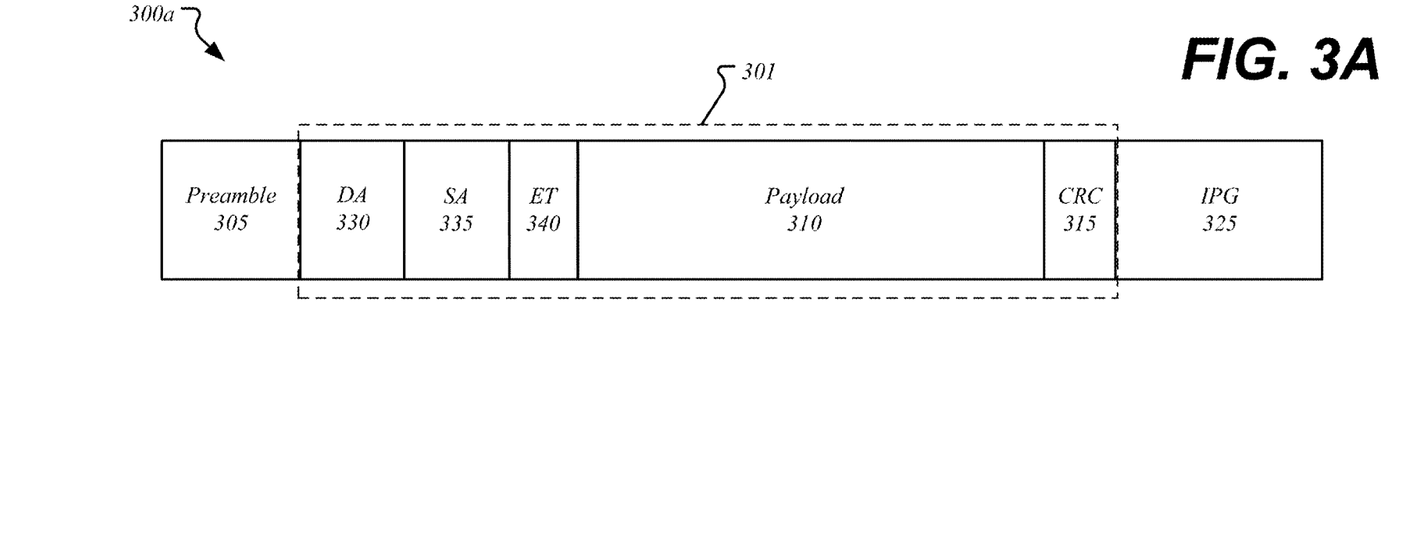
FIG. 3A illustrates a block diagram of an exemplary data frame.

FIG. 3A illustrates a block diagram of an exemplary data frame 300a. The data frame 300a includes a data packet 301 preceded by an accompanying preamble 305 and followed by an accompanying interpacket gap (IPG) 325. Data packet 301 includes a payload 310, a cyclic redundancy check (CRC) 315, a destination address 330, a source address 335, and an EtherType 340. Data packets 301 transmitted over the network 100 may be at least 64 bytes in size.

Figure 3B:
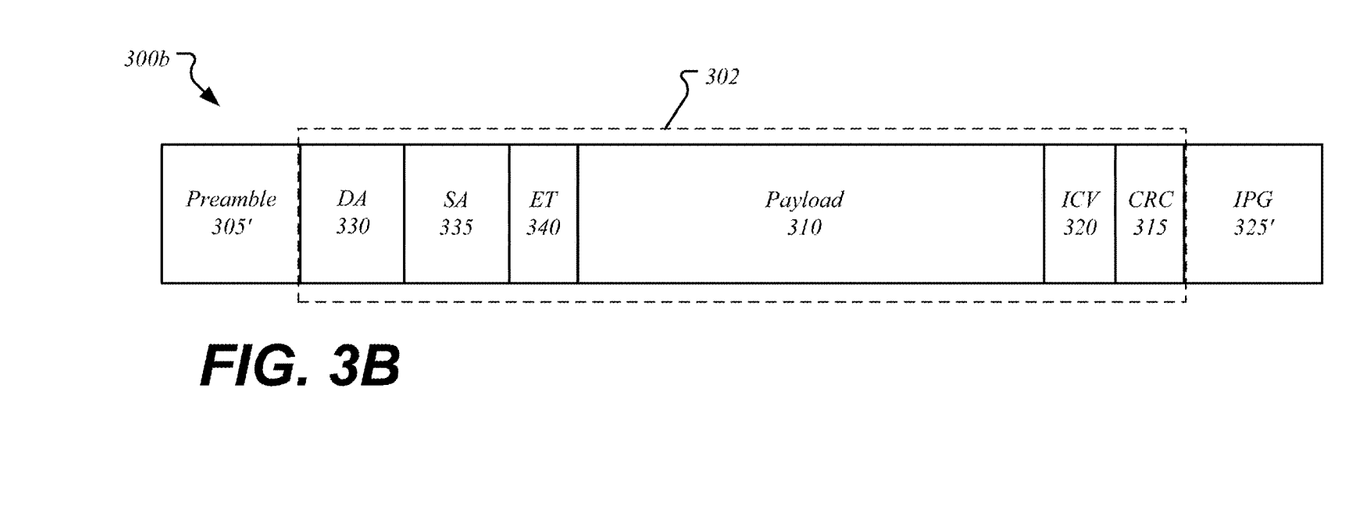
FIG. 3B illustrates a block diagram of a secured data frame including authentication information according to an exemplary implementation of the present disclosure.

FIG. 3B illustrates a block diagram of a secured data frame 300b (herein referred to as secured frame 300b), according to an exemplary implementation of the present disclosure. The secured frame 300b may resemble the data frame 300a in format and size, except that secured frame 300b includes a secured packet 302 accompanied by preamble 305' and IPG 325', which may be of a different size when compared to data packet 301, preamble 305, and IPG 325, as will be described later.

In one implementation, the data packet 301 may be 64 bytes and the accompanying preamble 305 and IPG 325 may add an additional 20 bytes to data frame 300a, wherein the preamble 305 is 8 bytes in size and the IPG 325 is 12 bytes in size on the link 215. Thus, the data packet 301 and accompanying preamble 305 and IPG 325 may take a transmission time that, is needed to transmit a data packet that is 84 bytes. The data packet 301 may be preceded with the preamble 305, which may include a known sequence of data used to denote the beginning of the data packet 301. In some implementations, for example IEEE 802.3, the start of the data frame 300a includes a 7 byte preamble and a 1 byte start frame delimiter (SFD) (not shown). The IPG 325 may be 4 bytes, 8 bytes, 10 bytes, 12 bytes, or greater than 12 bytes in size and configured to denote the end of the data frame 300a. In some implementations, the preamble 305 and IPG 325 may be known as other terms in the art, for example in 802.11 the IPG 325 may be known as the distributed coordination function (DCF) interframe space (DIES). Other terms of art may be used to describe the preamble 305 and IPG 325 as long as they serve the same function, i.e. the preamble 305 precedes the data packet 301 and signals the beginning of the data packet 301, and the IPG 325 follows the data packet 301 and signals the end of the data packet 301.

As previously mentioned, MACsec may secure the authenticity of the payload 310 by inserting a message authentication code security tag (SecTAG) and integrity check value (ICV) into the data packet 301 (not shown). The SecTAG and ICV may each contribute 16 bytes to the size of the data packet 301, or together may be 32 bytes in size, thereby increasing the effective size of the data packet 301 by 32 bytes, or 50%.

Thus, a system and method for message authentication that does not drastically increase the size of the data frame 300a may include a data link-level authentication scheme implemented in the PHY (e.g. the client and switch PHY 210, 225). In particular, the system and method may adjust how authentication data is carried with the data packet 301 and accompanying preamble 305 and IPG 325 during transmission by reallocating the preamble 305 and IPG 325 space to reduce data overhead and minimize the size of the data frame 300a on the link 215.

In one implementation, the transmitting PHY, for example the client PHY 210, may maintain a transmitter packet sequence count from which a transmitter packet sequence number is generated, both of which may be stored on the client memory 230 or in some other registers. The client PITY 210 may increment the transmitter packet sequence count by one with every secured frame 300b transmitted. For example, a 32-bit transmitter packet sequence count may be utilized.

In another implementation, the client PHY 210 may use a client key (not shown) to generate the lightweight ICV 320 using a keyed-hash. The lightweight ICV 320 size may be configurable, for example 2 bytes, or more than 2 bytes in size. The client PHY 210 may insert the lightweight ICV 320 into the data packet 301 before the CRC 315, and the client PHY 210 may insert the transmitter packet sequence number into preamble 305 (yielding preamble 305'). In an implementation, the client PHY 210 may insert the lightweight ICV 320 and transmitter packet sequence number into data frame 300a at arbitrary locations.

The size of the lightweight ICV 320 may correspond to a concomitant reduction of the IPG 325 size to IPG 325'. For example, the lightweight ICV 320 may be generated to a size of 4 bytes using a truncated keyed-hash and inserted into data packet 301, wherein the size of the IPG 325 is reduced from, for example, 12 bytes down to 8 bytes. By doing this, the size of the secured packet 302 and accompanying preamble 305' and IPG 325' is the same as the size of the data packet 301 and accompanying preamble 305 and IPG 325 when transmitted on the link 215 (i.e. data frame 300a is the same size as secured frame 300b when transmitted on the link 215). Even though the secured frame 300b includes additional authentication information, there is no reduction in transmission speed over the link 215 because the size of the additional authentication information (the lightweight ICV 320) is accommodated in the space previously occupied by a part of the IPG 325. Notably, this reduction in the IPG 325 size may not affect the efficacy with which it is detected, received, and read by the switch PHY 220. Moreover, after authentication, the switch PHY 220 may remove the authentication information added by the client PHY 210 to convert secured frame 300b back to data frame 300a before sending data frame 300a to the data link layer, thus rendering the disclosed authentication method essentially transparent to the data link layer.

Additionally, the CRC 315 may allow detection of tampered data within the data packet 301 and be 4 bytes in size. The destination address 330 and source address 335 may be 6 bytes each in size and the EtherType 340 may be 2 bytes in size. Together, the preamble 305 and CRC 315 may be 12 bytes in size and the payload 310 may be 46-1500 bytes in size.

Figure 4:
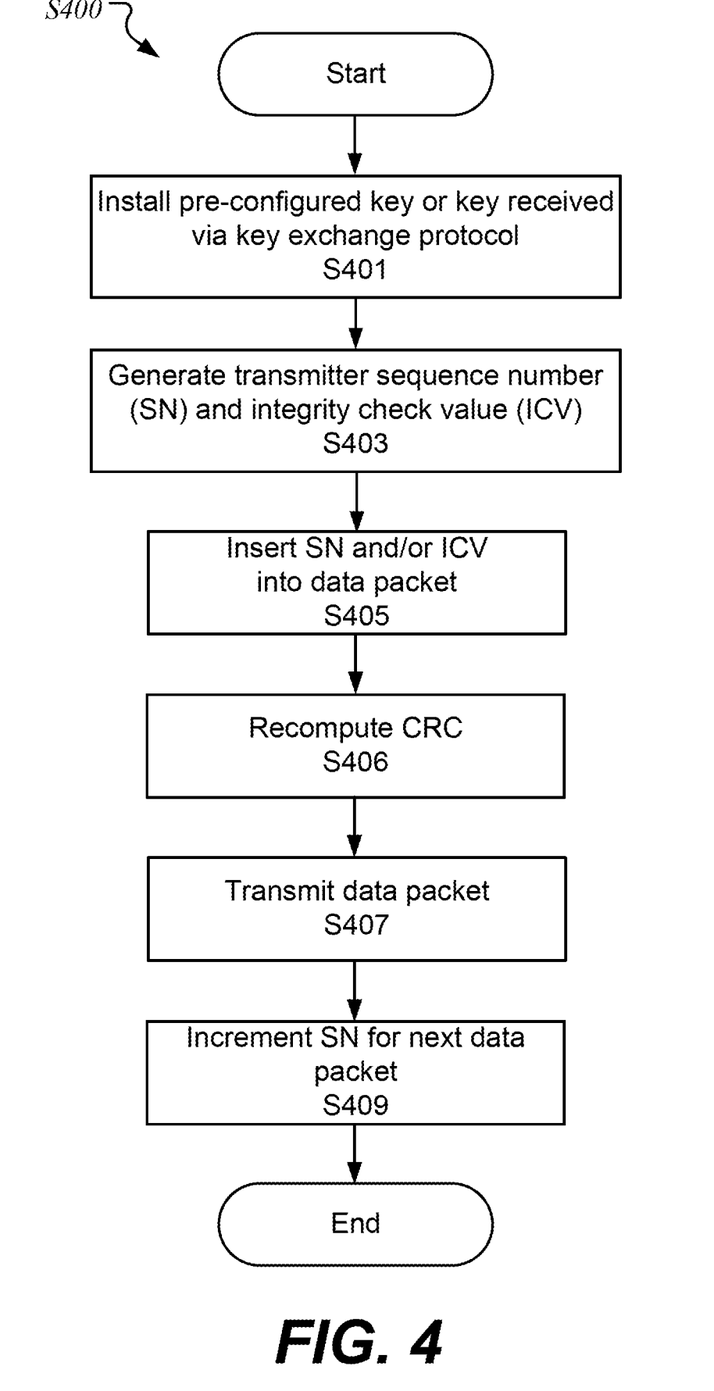
FIG. 4 illustrates a flowchart of a method of generating authentication information for a data frame and inserting it into the data frame according to an exemplary implementation of the present disclosure.

FIG. 4 illustrates a flowchart for a data packet authentication method S400 performed by the client 201 to secure the secured frame 300b, according to an exemplary implementation of the present disclosure. In one implementation, keys (not shown) for the data packet authentication method S400 may be stored at each end of the link 215, for example at the client 201 on the client memory 230 and at the switch 202 on the switch memory 235. In step S401, using a pre-configuration or a key-exchange mechanism such as MACsec Key Agreement (MKA) protocol, the keys may first be installed at each end of the link. Keys may be generated periodically by both endpoints.

In one implementation, the client memory 230 and switch memory 235 may be non-volatile memory, or one-time programmable memory. The client 201 and switch 202 may include a plurality of pre-programmed keys on the memory 230, 235 for each respective end of the link. A first pair of keys may be utilized for packet authentication until the client 201 is replaced in the secured network 200. Upon replacement with a new client (not shown), the first pair of keys may be invalidated and a second pair of pre-programmed keys on the memory 230, 235 may be used between the new client and the switch 202. This may be repeated fir as many pairs of keys are pre-programmed on the memory 230, 235. For example, a camera on a vehicle may need maintenance or replacement, in which case the first set of keys programmed on the replaced camera may be invalidated and the second set of keys programmed by the original equipment manufacturer (OEM) on the new camera may be used. A predetermined number of key pairs may be pre-programmed based on the expected lifetime of the client 201 or switch 202 and the expected number of replacement, events for either entity throughout the lifetime of operation for the secured network 200.

Keys generated periodically or configured on the one-time programmable memory 230, 235 may be included in specific registers at both endpoints and made accessible to the network in the PHYs (client PHY 210, switch PHY 220).

In one implementation, the transmitting PHY, for example the client PHY 210, may maintain the transmitter packet sequence count from which the transmitter packet sequence number is generated. In step S403, the client PHY 210 may increment the transmitter packet sequence count by one with every secured frame 300b transmitted. For example, a 32-bit transmitter packet sequence count may be utilized.

The client 201 may receive the data packet 301 from the data link layer (e.g. the MAC layer). The client PHY 210 may use the client key (not shown) to generate the lightweight ICV 320 using the keyed-hash, for example the truncated keyed-hash. The client PHY 210 may generate the lightweight ICV 320 using the truncated keyed-hash of the entire data packet 301 received from the data link layer, for example using the destination address 330, source address 335, EtherType 340, payload 310, and the transmitter packet sequence number. In one implementation, the client PHY 210 may generate the lightweight ICV 320 using the truncated keyed-hash of a portion of the data packet 301 received from the data link layer. The lightweight ICV 320 size may be configurable, for example 2 bytes, 4 bytes or more than 4 bytes in size.

In step S405, the client PHY 210 may insert the lightweight ICV 320 into the data frame 300a before the CRC 315 and the client PHY 210 may insert the transmitter packet sequence number into the data frame 300a, for example into preamble 305 (yielding preamble 305'), wherein the size of the lightweight ICV 320 corresponds to a concomitant reduction of the IPG 325 to IPG 325', which yields secured frame 300b including secured packet 302 and accompanying preamble 305' and IPG 325'. For example, the lightweight ICV 320 size may be 4 bytes and the IPG 325' may be reduced by 4 bytes down to 8 bytes. The insertion of the transmitter packet sequence number into the preamble 305 may result in a reduced amount of space available in preamble 305' when compared to 305 due to the presence of the transmitter packet sequence number. Insertion of the transmitter packet sequence number into the preamble 305 may over-write data in the preamble 305 in order to maintain a size of the preamble 305. In one implementation, data of the transmitter packet sequence number may be divided into at least two portions and inserted into the data frame 300a at varying locations. It may be appreciated that multiple adjustment of sizes for the at least two portions are possible in order to meet size restrictions for the features in the data frame 300a. For example, the transmitter packet sequence number may be 4 bytes in size and the preamble may be 8 bytes where a specific pattern of 6 bytes is required. Thus, the transmitter packet sequence number may be divided into two portions; wherein each portion is 2 bytes in size, a first portion over-writes 2 bytes of the preamble 305, and a second portion is inserted into the data frame 300a and reduces the size of the IPG 325 by 2 bytes.

In one implementation, the client PHY 210 may insert the lightweight ICV 320 into the data frame 300a. Moreover, the client PITY 210 may insert the transmitter packet sequence number into the data frame 300a. It may be appreciated that there are many combinations of locations for inserting the lightweight ICV 320 and transmitter packet sequence number into the data frame 300a.

In one exemplary implementation of S405, the client PITY 210 may use a client key to generate the lightweight ICV 320 and insert the lightweight ICV 320 into the data frame 300a. In this implementation, the client PHY 210 may perform the generation and insertion without generating and inserting a transmitter packet sequence number. In this implementation, S409 is not performed as a transmitter packet sequence number is not inserted. The insertion of the lightweight ICV 320 into the data frame 300a reduces the size of the IPG 325 while maintaining a total number of bytes of the data frame 300a.

In another exemplary implementation of S405, the client PHY 210 may maintain a transmitter packet sequence counter and insert a transmitter packet sequence number into the data frame 300a. In this implementation, the client PHY 210 may insert the transmitter packet sequence number without generating and inserting a lightweight ICV 320. Insertion of the transmitter packet sequence number into the data frame 300a reduces the size of the IPG 325 while maintaining a total number of bytes included in the data frame 300a.

In step S406, the client PHY 210 may recompute the CRC 315 based on the contents of the data packet 301 with preamble 305' and lightweight ICV 320. In step S407, the client 201 may transmit the secured packet 302 to the switch 202. In one implementation, the size of the secured packet 302 and accompanying preamble 305' and IPG 325' is the same size as the data packet 301 and accompanying preamble 305 and IPG 325 (i.e. data frame 300a is the same size as secured frame 300b) even with the additional authentication information because space from the IPG 325 and preamble 305 was reallocated to storing the lightweight ICV 320 and transmitter packet sequence number (yielding IPG 325' and preamble 305'). As previously, mentioned, MACsec security information may result in significant increases f bandwidth consumption, for example an additional 32 bytes of authentication information added to a data packet and transmitted on a 100 megabit link, thus consuming an additional 28% of bandwidth. Notably, the disclosed method may beneficially be used in low bandwidth networks/low speed links since overhead from the added authentication information is minimized while the payload information is not affected and the authentication method is transparent to the data link layers. For example, the disclosed method may be particularly effective for low speed links like 100 Mb/s BroadR-Reach or 100Base-T1 links and future lower speed links, for example 10 Mb/s. The system and method may also be applicable to 1 Gb/s links and multi-gigabit links, e.g., 2.5 Gb/s, 5 Gb/s and 10 Gb/s.

In step S409, the client 201 may increment the transmitter packet sequence count, by one for any subsequent received data packet 301 and accompanying preamble 305 and IPG 325. In an alternative implementation, the transmitter packet sequence count is not maintained and step S409 may be skipped.

Figure 5:
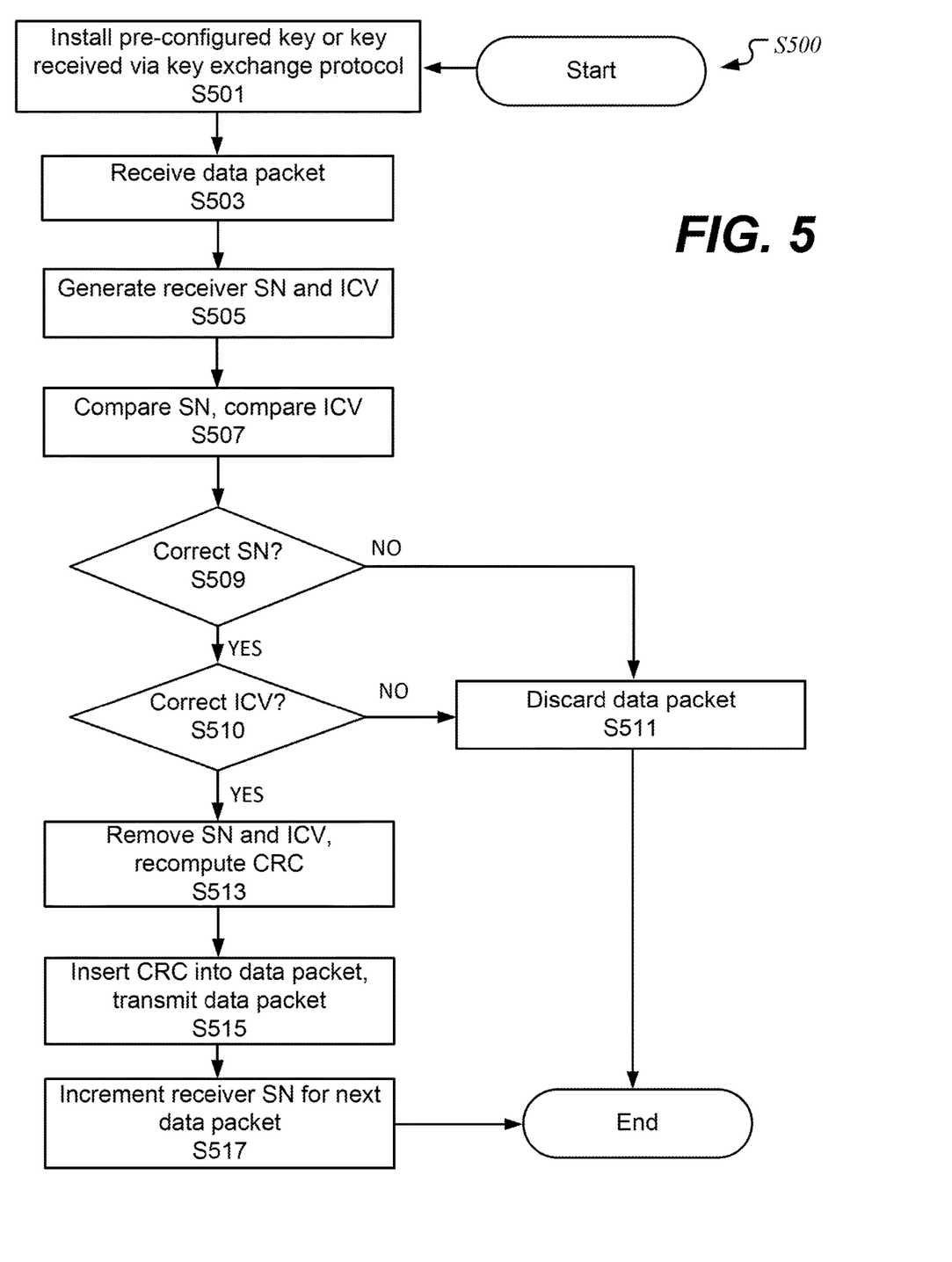
FIG. 5 illustrates a flowchart of a method of authenticating a received secured data frame according to an exemplary implementation of the present disclosure.

FIG. 5 illustrates a flowchart for a data packet authentication method S500 performed by the receiver, for example the switch 202, that authenticates the secured packet 302, according to an exemplary implementation of the present disclosure. As mentioned previously, in step S501 the keys may first be installed at each endpoint. These keys may be statically pre-configured in non-volatile memory or created dynamically each time the system by a key exchange protocol. In one implementation, the receiving PHY, for example the switch PHY 220, may maintain a receiver packet sequence count from which a receiver packet sequence number is generated, both of which away be stored on the switch memory 235 or registers.

In step S503, the switch PHI 220 may receive a secured packet 302 and accompanying preamble 305' and IPG 325' and extract the transmitter packet sequence number from the preamble 305'.

In step S505, the switch PHY 220 may increment the receiver packet sequence count by one with each secured packet 302 received, wherein the receiver packet sequence count corresponds to the transmitter packet sequence count. For example, a 32-bit receiver packet sequence count may be utilized.

In step S507, the switch PHY 220 may verify the transmitter packet sequence number with an expected receiver packet sequence number based on the receiver packet sequence count. The switch PITY 220 may use a switch key (not shown) to generate the lightweight ICV 320 using a keyed-hash, for example a truncated keyed-hash. The switch PITY 220 may generate the lightweight ICV 320 using a truncated keyed-hash of the entire data packet 301 received from the client 201, for example using the destination address 330, source address 335, EtherType 340, payload 310, and the transmitter packet sequence number. If a portion of the data packet 301 is used to generate the lightweight ICV 320 at the transmitter PHI (client PRY 210), then the configuration may be programmed such that the receiver PHY (switch PHI 220) generates the lightweight ICV 320 using the same portion of the data packet 301. In step S510, the switch PHY 220 may compare the lightweight ICV 320 generated by the switch PHY 220 to the lightweight IC V 320 received with the secured frame 300b (generated and inserted by the client PHI 210). Notably, the contents of the secured packet 302 along with the transmitter packet sequence number may be hashed with the switch key to generate the lightweight ICV 320, thereby ensuring that the correct sequence numbers are needed for authentication.

In an alternative implementation, the transmitter packet sequence count is not maintained and the data frame 300a does not include a transmitter packet sequence number. Thus, the switch PHI 220 in step S507 may not verify the transmitter packet sequence number with the expected receiver packet sequence number. The switch PHY 220 may still generate the lightweight ICV 320 from the entirety or a portion of data packet 301 without the transmitter packet sequence number for authentication.

The switch PHY 220 may accept the secured packet 302, preamble 305' and IPG 325' if the two lightweight ICV 320 values match, otherwise in step S511 the switch PHI 220 may discard the secured packet 302, preamble 305' and IPG 325' if the two values do not match since a mismatch may signal that; the secured frame 300b has been tampered with by the hacker 103.

For the accepted secured fame 300b, the switch PHY 220 may remove the transmitter packet sequence number and the lightweight ICV 320 from the secured frame 300b, and recompute the CRC 315 based on the contents of the data frame 300a without the preamble 305' and lightweight ICV 320. In step S515, the switch PHY 220 may re-insert the CRC 315, yielding data frame 300a with a valid CRC, preamble 305, and IPG 325. Note that the IPG 325' may be restored to the original size (i.e. IPG 325), for example 12 bytes, and content. The switch PHY 220 may transmit the data frame 300a (data packet 301, preamble 305 and IPG 325) in the original, standard format to the data link layer (i.e. the MAC layer). Notably, the data link layer will not be able to detect that the aforementioned authentication steps have taken place because the original transmission format has been stored prior to reaching the data link layer. In step S517, the switch PHY 220 may increment the sequence count by one for the next received secured frame 300b.

While the secured frame 300b may include a form, of authentication, information transmitted across the link 215 may still be accessible and readable by the hacker 103. In one implementation, an encryption method may be applied to provide secrecy of the transmitted information.

In one implementation, the keyed-hash used to generate the lightweight ICV 320 may be a hash-based message authentication code (HMAC), wherein the hashing function F may be, for example, CRC, MD5, SHA-1, SHA-2, etc. In one implementation, a known cryptographic protocol such as a variant of AES, like AES-GCM, AES-CCM or AES-CBC, is used. In one implementation, a truncated keyed-hash is used, wherein a predetermined number of bytes, for example the least significant 4 bytes, are used (inserted into the secured packet 302) and the rest are discarded. It can be appreciated by those in the art that myriad hashing mechanisms or cryptographic mechanisms may be used to adjust, the size of the hash data inserted into the secured frame 300b depending on the application and link 215 bandwidth in order to maintain a predetermined secured frame 300b size.

In one implementation, the size of the secured frame 300b may be expanded to accommodate a larger lightweight ICV 320. For example, hashing 64 bytes of data down to 4 bytes may allow for a predetermined number of combinations of 64 bytes that use the same 4 bytes after hashing, Thus, the larger the hash, the more secure the authentication scheme may be such that two ages using the same hash becomes a lower probability. A user may determine that 4 bytes is too little and may prefer to hash down to 8 bytes instead. With the larger lightweight ICV 320 size, more space be reallocated from the IPG 325 to fit the larger lightweight ICV 320. For example, 8 bytes of data from the IPG 325 may be reallocated to accommodating the 8 byte lightweight ICV 320 when inserted into the data frame 300a. In one implementation, the size of the data frame 300a may be grown to accommodate the additional size. For example, the data frame 300a and secure frame 300b size may increase by 4 bytes, from 84 bytes to 88 bytes, to preserve the size of the IPG 325 at 8 bytes (instead of reducing by 8 bytes down to 4 bytes). In this implementation, overhead is reduced (as compared to, for example, MACsec) instead of eliminated. That is to say, a comparatively small percentage of overhead is added to the size, for example <50%.

In one implementation, a replay attack may be used to insert a tampered data packet when the sequence count wraps back around to the beginning. The replay attack may be prevented by exchanging new keys before the sequence counter wraps.

In one implementation, the client 201 and the switch 202 may communicate without, or in addition to, link 215. Notably, the transmitter packet sequence count and lightweight ICV 320 authentication features may be transmitted to clients and switches on wired or wireless networks. Due to reduced transmission speeds across wireless networks, the lightweight mechanism of the present disclosure for maintaining message integrity is especially relevant since overhead from the added authentication information is minimized while the payload information is not affected.

Advantageously, the disclosed method improves how authentication data is carried and hidden within the data frame 300a via accompanying preamble 305 and IPG 325 by reallocating space from the preamble 305 and IPG 325 in order to preserve the size of the data packet 301. Notably, the insertion of the lightweight ICV 320 is smaller in size than the ICV (and subsequent growth in size of the transmitted data frame) used in other authentication or encryption schemes, such as MACsec. Using the proposed authentication method, the two data link layers at the transmitter side and the receiver side away not detect any difference upon transmission or receipt of the data frame 300a because all alteration, authentication, and re-conversion of the data frame 300a back to standard format is performed at the PHY level (layer-1) by the client PHY 210 and switch PHY 220. Also, by reallocating the preamble 305 and IPG 325 space allocations for insertion of the lightweight ICV 320 and transmitter packet sequence number information, the additional information or data overhead is essentially hidden during transmission. That is to say, a predetermined transmission length, for example an 84 bytes length, stays at 84 bytes. Finally, while space is saved and data packet size is conserved, the information benefits from a form of authentication to detect tampering by the hacker 103 snooping on the link 215.

Additionally, the processing performed by the processing circuitry, discussed above with respect to FIGS. 2-5, may be performed according to computer executable instructions stored in a non-transitory computer readable recording medium. Further, the computer executable instructions may be stored on an external computer connected to a network such or maybe be distributed by being downloaded via a network (wired and/or wireless) to an executing apparatus.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed system were combined in a different manner, or if, the components were replaced or supplemented by other components.

As will be understood by those skilled in the art, the present disclosure may be embodied in, other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A transmitting device, comprising:
processing circuitry configured to
maintain a transmitter packet sequence counter;
generate an integrity check value (ICV);
insert a transmitter packet sequence number according to the transmitter packet sequence counter into a data frame that includes a data packet, the data packet including a payload, wherein the data packet follows a preamble and an interpacket gap (IPG) follows the data packet;
insert the ICV into the data frame; and
transmit the data frame, wherein
the processing circuitry maintains the transmitter packet sequence counter by incrementing a transmitter packet sequence counter value by one with each data frame transmitted, and
inserting the ICV into the data frame reduces the size of the IPG while maintaining a total number of bytes in the data frame.

2. The transmitting device of claim 1, wherein the processing circuitry generates the ICV using a truncated keyed-hash based on at least a portion of the data packet and the transmitter packet sequence number.

3. The transmitting device of claim 1, wherein the size of the data frame increases by less than 50%.

4. The transmitting device of claim 1, wherein
at least a portion of the data packet is encrypted using an a cryptographic protocol,
at least one security field is inserted into the data frame, and
the insertion of the at least one security field reduces the size of the IPG.

5. The transmitting device of claim 1, wherein the processing circuitry inserts the transmitter packet sequence number into the data frame in the preamble.

6. The transmitting device of claim 1, wherein the processing circuitry inserts the ICV into the data frame after the payload.

7. The transmitting device of claim 1, wherein the transmitter packet sequence counter is 32-bit.

8. An apparatus, comprising:
processing circuitry configured to
receive a data frame including a transmitter packet sequence number, an integrity check value (ICV), and a data packet, the data packet including a payload, wherein the data packet follows a preamble and an interpacket gap (IPG) follows the data packet;
compare a receiver packet sequence number from a receiver packet sequence counter to the transmitter packet sequence number;
determine whether the transmitter packet sequence number is valid based on the receiver packet sequence number;
in response to determining that the transmitter packet sequence number is valid, determine whether the ICV is valid; and
in response to determining that the ICV is valid, remove the transmitter packet sequence number and the ICV from the data frame; and
maintain the receiver packet sequence counter by incrementing a sequence counter value by one with each data frame received, wherein
removal of the transmitter packet sequence number and the ICV restores the format of the data frame to a format readable by a data-link layer, and
the processing circuitry maintains the receiver packet sequence counter by incrementing the receiver packet sequence counter by one with each data frame received.

9. The apparatus of claim 8, wherein the processing circuitry is further configured to discard the data frame in response to determining the transmitter packet sequence number is invalid.

10. The apparatus of claim 8, wherein the processing circuitry is further configured to discard the data frame in response to determining the ICV is invalid.

11. A method performed by a transmitting device that communicates with a receiving device via a network, the method comprising:
maintaining a transmitter packet sequence counter;
generating an integrity check value (ICV);
inserting, by processing circuitry of the transmitting device, a transmitter packet sequence number into a data frame that includes a data packet, the data packet including a payload,
wherein the data packet follows a preamble and an interpacket gap (IPG) follows the data packet;
inserting, by the processing circuitry, the ICV into the data frame; and
transmitting the data frame, wherein
the maintaining the transmitter packet sequence counter includes incrementing a transmitter packet sequence counter value by one with each data frame transmitted, and
inserting the ICV into the data frame reduces a size of the IPG while maintaining a total number of bytes in the data frame.

12. The method of claim 11, wherein generating the ICV uses a truncated keyed-hash based on at least a portion of the data packet and the transmitter packet sequence number.

13. The method of claim 11, wherein inserting the transmitter packet sequence number and ICV into the data frame increases a size of the data frame.

14. The method of claim 13, wherein the size of the data frame increases by less than 50%.

15. The method of claim 11, wherein
at least a portion of the data packet is encrypted using a cryptographic protocol,
at least one security field is inserted into the data frame, and
the insertion of the at least one security field reduces the size of the IPG.

16. The method of claim 11, wherein the processing circuitry inserts the transmitter packet sequence number into the data frame in the preamble.

17. A transmitting device, comprising:
processing circuitry configured to
generate an integrity check value (ICV) using a truncated keyed-hash based on at least a portion of a data packet and a transmitter packet sequence number; and
insert the ICV into a data frame that includes the data packet, the data packet including a payload, wherein the data packet follows a preamble and an interpacket gap (IPG) follows the data packet, and inserting the ICV into the data frame reduces the size of the IPG while maintaining a total number of bytes in the data frame.

18. The transmitting device of claim 17, wherein the processing circuitry wherein the processing circuitry inserts the ICV into the data frame after the payload.

19. An apparatus, comprising:
processing circuitry configured to
  maintain a transmitter packet sequence counter;
  insert a transmitter packet sequence number according to the transmitter packet sequence counter into a data frame that includes a data packet, the data packet including a payload, wherein the data packet follows a preamble and an interpacket gap (IPG) follows the data packet; and
  transmit the data frame, wherein
    the processing circuitry maintains the transmit packet sequence counter by incrementing a transmitter packet sequence counter value by one with each data frame transmitted, and
    inserting the transmitter packet sequence number into the data frame reduces the size of the IPG while maintaining a total number of bytes in the data frame.

20. The transmitting device of claim 19, wherein the processing circuitry is further configured to generate an ICV using a truncated keyed-hash based on at least a portion of the data packet and the transmitter packet sequence number and to insert the ICV into the data frame.

* * * * *

UNITED STATES PATENT AND TRADEMARK OFFICE
CERTIFICATE OF CORRECTION

PATENT NO. : 11,190,528 B2  
APPLICATION NO. : 16/172206  
DATED : November 30, 2021  
INVENTOR(S) : Tzeng et al.

Page 1 of 1

It is certified that error appears in the above-identified patent and that said Letters Patent is hereby corrected as shown below:

In the Claims

Column 13, Line 35: Remove "an" after --using--;

Column 15, Line 5: Remove "wherein the processing circuitry" after --processing circuitry--.

Signed and Sealed this  
Fourth Day of April, 2023

Katherine Kelly Vidal  
*Director of the United States Patent and Trademark Office*